(12) United States Patent
Krivoruchko

(10) Patent No.: US 6,986,144 B2
(45) Date of Patent: Jan. 10, 2006

(54) PROTECTED RESOURCE ACCESS IN AN OBJECT-ORIENTED COMPUTING ENVIRONMENT

(75) Inventor: Michael Krivoruchko, Dublin (IL)

(73) Assignee: Sun Microsystems, Inc., Santa Clara, CA (US)

( * ) Notice: Subject to any disclaimer, the term of this patent is extended or adjusted under 35 U.S.C. 154(b) by 569 days.

(21) Appl. No.: 10/131,703

(22) Filed: Apr. 23, 2002

(65) Prior Publication Data

US 2002/0199033 A1    Dec. 26, 2002

(30) Foreign Application Priority Data

Apr. 24, 2001  (EP)  ................................... 01303704

(51) Int. Cl.
*G06F 9/44*    (2006.01)
(52) U.S. Cl. ..................................... 719/315; 717/116
(58) Field of Classification Search ........ 719/315–318, 719/331; 718/104; 717/116–118, 108, 145, 717/158
See application file for complete search history.

(56) References Cited

U.S. PATENT DOCUMENTS 6,507,946 B2 * 1/2003 Alexander et al. .......... 717/145
6,658,657 B1 * 12/2003 Lueh .......................... 717/158
6,779,188 B1 * 8/2004 Blandy et al. .............. 719/331

OTHER PUBLICATIONS

Stroustrup, B., *The C++ Programming Language*, New York Addison Wesley, pp. 191-193, 434-439, 457-465 (XP002018415).

* cited by examiner

*Primary Examiner*—St. John Courtenay, III
(74) *Attorney, Agent, or Firm*—Gunnison, McKay & Hodgson, L.L.P.; Forrest Gunnison

(57) ABSTRACT

Access is provided in an object-oriented computing environment by an instance of a first class to a selected protected resource of an instance of a second class. This involves defining a third class that includes a protected virtual method for accessing the selected protected resource. The first class is defined as a subclass of the third class such that the first class inherits from the third class an access-resource method for the protected resource and a pointer to an instance of the second class as an implementation of the third class. The second class is defined as a subclass of the third class such that the second class inherits from the third class and implements the protected virtual method for accessing the selected protected resource by overloading that method. With this structure in place, an instance of the first class calls the access-resource method inherited from the third class, which access-resource method uses the pointer to the instance of the second class and the overloaded method to access the resource.

16 Claims, 5 Drawing Sheets

PROTECTED RESOURCE ACCESS IN AN OBJECT-ORIENTED COMPUTING ENVIRONMENT

BACKGROUND OF THE INVENTION

1. Field of the Invention

The present invention relates generally to, and more particularly to object-oriented computing environments, and in particular to assessing a protected resource of an object of a first class by an object of a second class in an object-oriented computing environment.

2. Description of Related Art

In an object-oriented computing environment in a computer system, the resources provided by instances of classes can be defined as pubic, or as private. Instances of other classes can access instances of classes defined as public. However, instances of other classes normally cannot access instances of classes defined as private.

Some computer programming languages do provide a way of allowing an instance of one class to access protected resources of the instance of another class. For example, the C++ computer programming language provides a keyword friend that lets a first class specify a set of classes as friend classes. Instances of the friend classes can access the resources of instances of the first class. Keyword friend effectively opens up all of the resources of instances the first class, as the implementation of keyword friend does not allow an explicit set of resources to be specified that can be accessed by a friend class instance.

Thus, the known keyword friend approach in the C++ computer programming language can be used to allow access by a client to the resources of a supplier. However, this is only possible if the client had been specifically identified as a friend in the supplier. Moreover, each time the list of clients to be classed as friends of the supplier changes, the supplier has to be re-written to accommodate the change.

Each time the supplier is re-written to accommodate a change, this is a potential source of error, particularly if it is expected that a list of clients with access to the supplier is frequently changing. Moreover, once a client has been identified as a friend of the supplier, the client then has access to all of the resources of the supplier. This mechanism does not allow for access to only selected resources of the supplier.

Further information on the C++ computer programming language, including the use of "friends", can be found in "The C++ Programming language, Special Edition" by Bjarne Stroustrup, published by Addison Wesley, Reading Mass. (ISBN 0-201-70073-5). Also, various object-oriented computer programming techniques are described in "Design Patterns—Elements of Reusable Object-Oriented Software" by E Gamma et al, published by Addison Wesley, Reading Mass. (ISBN 0-201-63361-2).

One technique, called a bridge pattern, and also known as a handle-body, enables an abstraction to be decoupled from its implementation so that the two can vary independently. When an abstraction can have several possible implementations, the usual way to address this is to use inheritance. However, inheritance binds an implementation to the abstraction permanently. The bridge pattern avoids problems caused by this binding by putting the abstraction and its implementation into different class hierarchies.

Another technique is called a proxy, or surrogate, which provides a surrogate or placeholder for another object to control access to that object. One potential use for a proxy is where the creation of a real object, e.g. an image, can be expensive in processing terms. Ideally therefore, such a real object should only be created on demand. To hide that the real object is only created on command, the proxy approach provides that another object, a proxy, acts as a stand-in for the real object until the real object is to be created.

SUMMARY OF THE INVENTION

One aspect of the invention provides a process that enables access in an object-oriented computing environment by an instance of a first class to a selected protected resource of an instance of a second class. The process includes defining a third class that includes a protected virtual method for accessing the selected protected resource. The first class is defined as a subclass of the third class such that the first class inherits the protected virtual method from the third class as an access-resource method for the protected resource and a pointer to an instance of the second class as an implementation of the third class. The second class is defined as a subclass of the third class such that the second class inherits from the third class and implements the protected virtual method for accessing the selected protected resource by overloading that method to create an overloaded method. With this structure in place, an instance of the first class calls an access-resource method. The access-resource method uses the pointer to the instance of the second class and the overloaded method to access the resource.

An embodiment of the invention, thus, enables one class to access a protected resource of the other class by arranging both classes to inherit from the third class, which forms a handshake (or service handle) class. The properties of the inheritance enable an instance of the first class to use the protected virtual method, which is overloaded by the resource method of the second class, to access the protected resource of the second class.

In another embodiment of the invention, a constructor in the first class provides a pointer to the constructor of the third class. The access-resource method of the first class is a public method so that the accessing of the resource by the instance of the first class can be initiated in response to a call to the access-resource method of the instance of the first class.

An embodiment of the invention is implemented in a C++ computer programming language computing environment. The protected resource of the second class can be any one of a service, data or a functionality or a combination thereof.

Another aspect of the invention provides a computer program product operable to carry out the above mentioned process for enabling access in an object-oriented computing environment by an instance of a first class to a selected protected resource of an instance of a second class. The computer program product can be provided on a carrier medium.

A further aspect of the invention provides a computer system including a processor, memory, and computer code stored in the memory. The computer code is operable to control the processor to perform the operations of the aforementioned process. Also, an embodiment of the invention can provide a C++ idiom that enables an instance of a first class to access the protected resources of another class where first class does not inherit from that other class.

BRIEF DESCRIPTION OF THE DRAWINGS

In the drawings and the following detailed disclosure, elements with the same reference numeral are the same or equivalent elements. Also, the first digit of a reference numeral indicates the drawing in which the element associated with the reference numeral first appears.

DETAILED DESCRIPTION

Figure 1A:
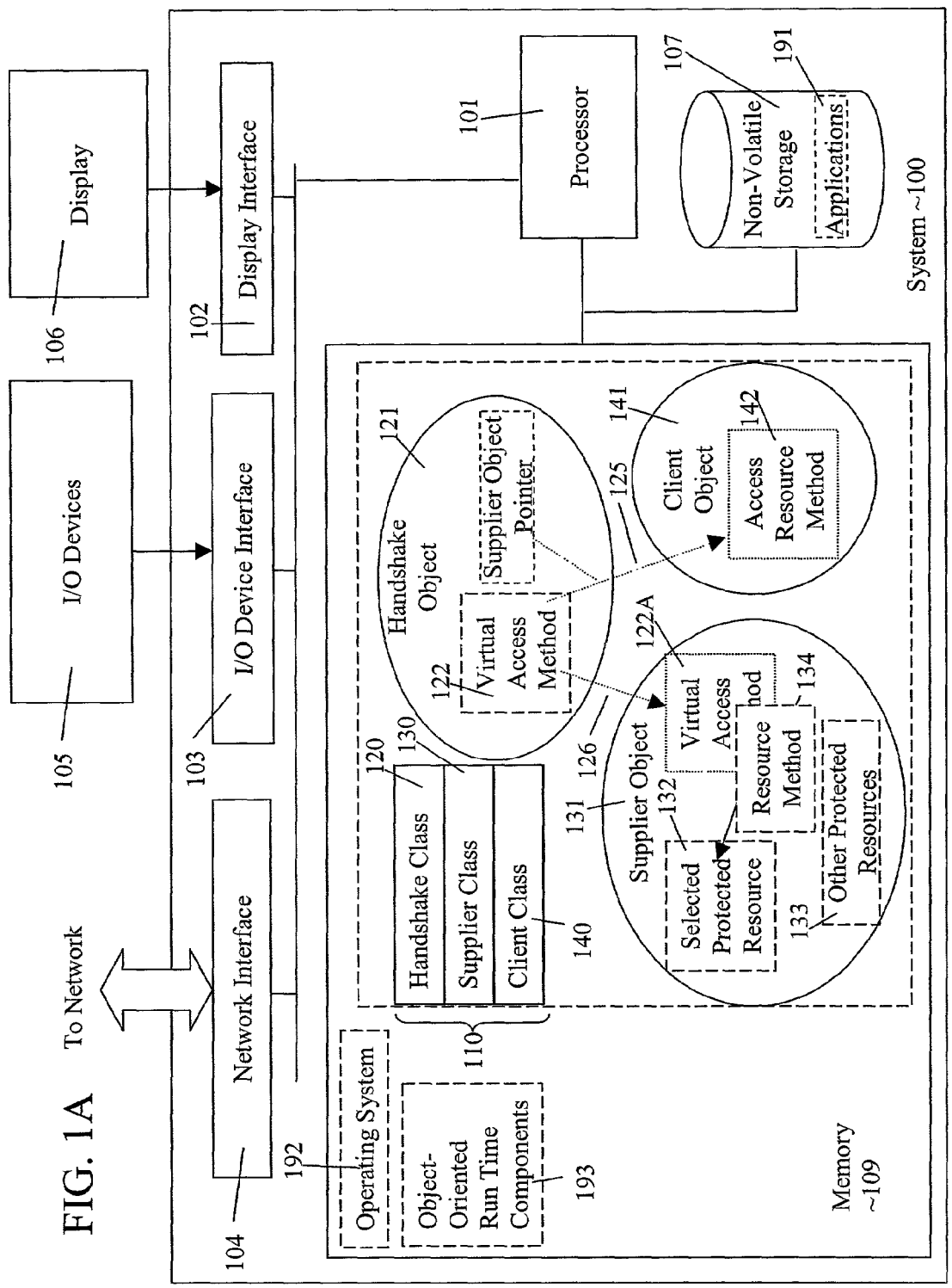
FIG. 1A is an illustration of a system that includes classes and instances of these classes according to one embodiment of the present invention.

In one embodiment of the present invention, a set of object-oriented classes 110 (FIG. 1A) allows instances 121, 131 and 141, sometimes called objects, of these classes to overcome the prior art limitations associated with a client instance 141 accessing a selected protected resource 132 of a supplier instance 131. In this embodiment, client instance 141 is allowed access to resource 132 without allowing client instance 141 access to all other protected resources 133 of supplier instance 131. Moreover, it is no longer necessary to rewrite the source code of supplier class 130 each time a new client is given access to selected protected resource 133.

Hence, classes 110 and the corresponding objects eliminate the prior art limitations of sharing either none or all of the protected resources of a particular object. In addition, the potential source of error associated with rewriting the source code for a supplier class to accommodate new clients has been eliminated.

Hence, one embodiment of the present invention provides a process that enables access in an object-oriented computing environment by an instance 141 of a client class 140, i.e., a first class 140, to a selected protected resource 132 of an instance 131 of a supplier class 130, i.e., a second class 130. The process includes defining a handshake class 120, i.e., a third class 120, that includes a virtual access method 122 for accessing selected protected resource 132.

The particular names given to the three classes are not essential. The class names used herein are intended only to assist in visualizing the various embodiments of the invention.

First class 140 is defined as a subclass of third class 120 such that instance 141 of first class 140 inherits from third class 120. Accordingly, as explained more completely below, instance 141 inherits virtual access method 122 for selected protected resource 132 as access resource method 142 and a pointer 123 to an instance 131 of second class 130 as an implementation of the third class. This is represented schematically in FIGS. 1A and 1B by broken arrow 125.

Figure 1B:
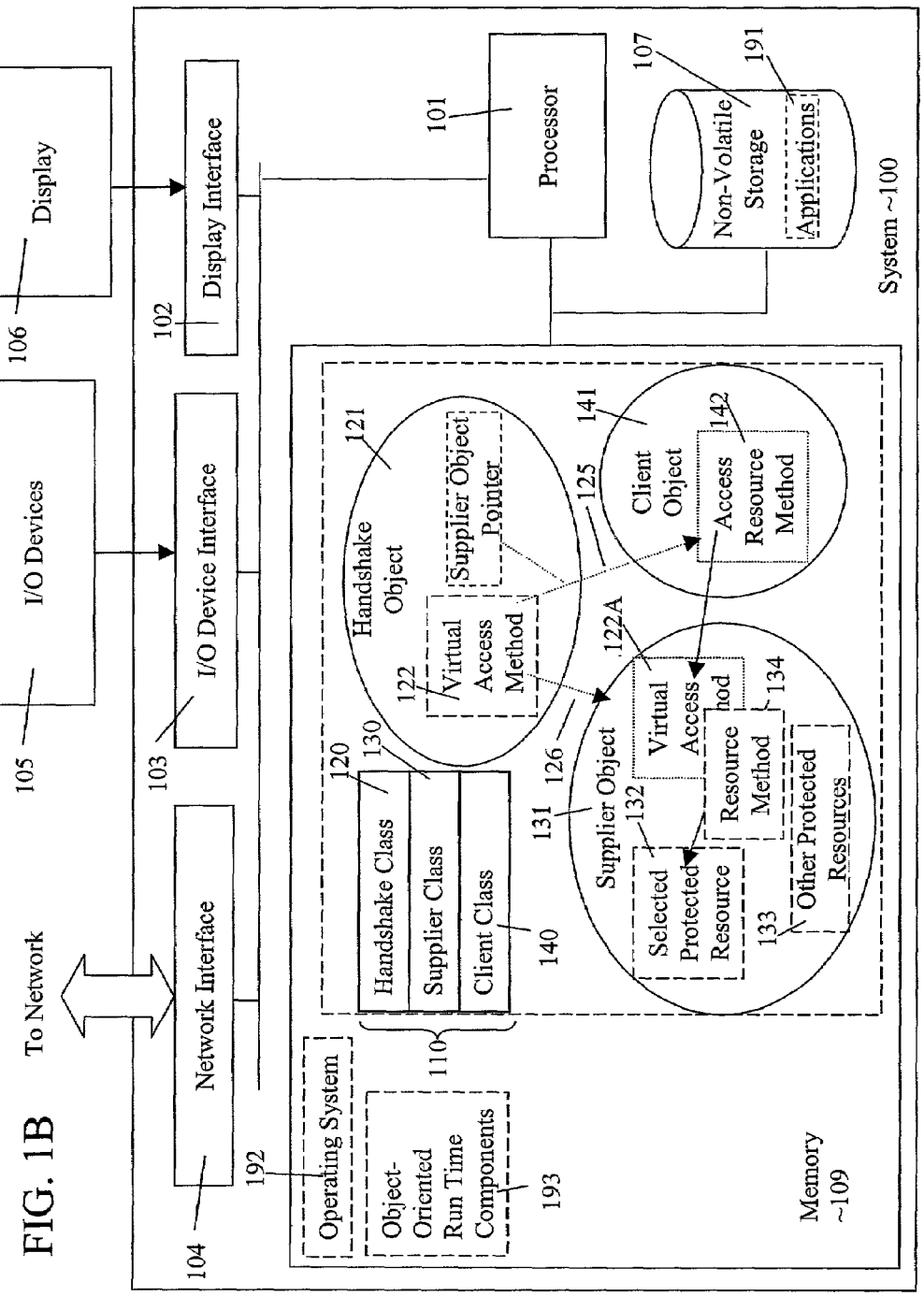
FIG. 1B is an illustration of a system that includes classes and how instances of these classes are used in accessing a selected protected resource according to one embodiment of the present invention.

Second class 130 also is defined as a subclass of third class 120 such that an instance 131 of second class 130 inherits from third class 130 and implements protected virtual access method 122 for accessing selected protected resource 132 by overloading method 122. This is schematically illustrated in FIGS. 1A and 1B by broken arrow 126 and the overlay of methods 134 and 122 in FIG. 1B.

With this structure in place, instance 141 of first class 140 calls access-resource method 142. Access-resource method 142 uses pointer 123 to instance 131 of second class 130 and the overloaded method to access resource 132.

An example of an embodiment of the present invention is described in the context of a C++ computer programming language environment and assumes knowledge of the C++ computer programming language environment. For further details of the C++ computer programming language can be found in any number of publicly available books, for example in the book entitled "The C++ Programming language, Special Edition" by Bjarne Stroustrup as referenced earlier.

However, the used of the C++ computer programming language environment is illustrative only and is not intended to limit the invention in its application to the C++ computer programming language environment, sometimes called C++ computer program language computing environment. In view of this disclosure, those of skill in the art can implement the invention in other computer programming language environments. Moreover, when it is stated herein that an instance performs some action or that some action is taken, those of skill in the art understand that the action is the result of the execution of one or more operations by a computer-processor.

A C++ computer programming language environment is provided, for example, in a computer system 100, whether that be a stand-alone or a networked computer system, as is apparent to one of skill in the art. FIGS. 1A and 1B are a schematic representation of some typical hardware components found in a computer system 100.

A processor 100 is connected to a bus system that can comprise one or more different buses. Main memory 109 is also connected to the bus system and is accessible by processor 101. One or more storage devices 107 are connected to the bus system via a storage adapter (not shown).

A network interface 104 can connect computer system 100 to an external network. A user input interface 103 connects user input/output devices 105, such as a keyboard and a pointing device to the bus system. A display interface 102 connects a display device 106 to the bus system.

FIGS. 1A and 1B are a schematic representation, only, of typical hardware components to be found in a computer system. However, the embodiments of the invention can be implemented using any conventional computer technology and so are not limited to the particular system illustrated in FIGS. 1A and 1B.

Typical software components, e.g., operating system 192 and object-oriented run time components 193, used with the embodiments of the present invention are typically stored on storage device(s) 107 and are loaded into main memory 109 of computer system 100 as required, for example upon turning on the computer system. Similarly, C++ user applications 191 are stored on device(s) 107 and loaded into memory 109 in whole or part as required.

Figure 2:
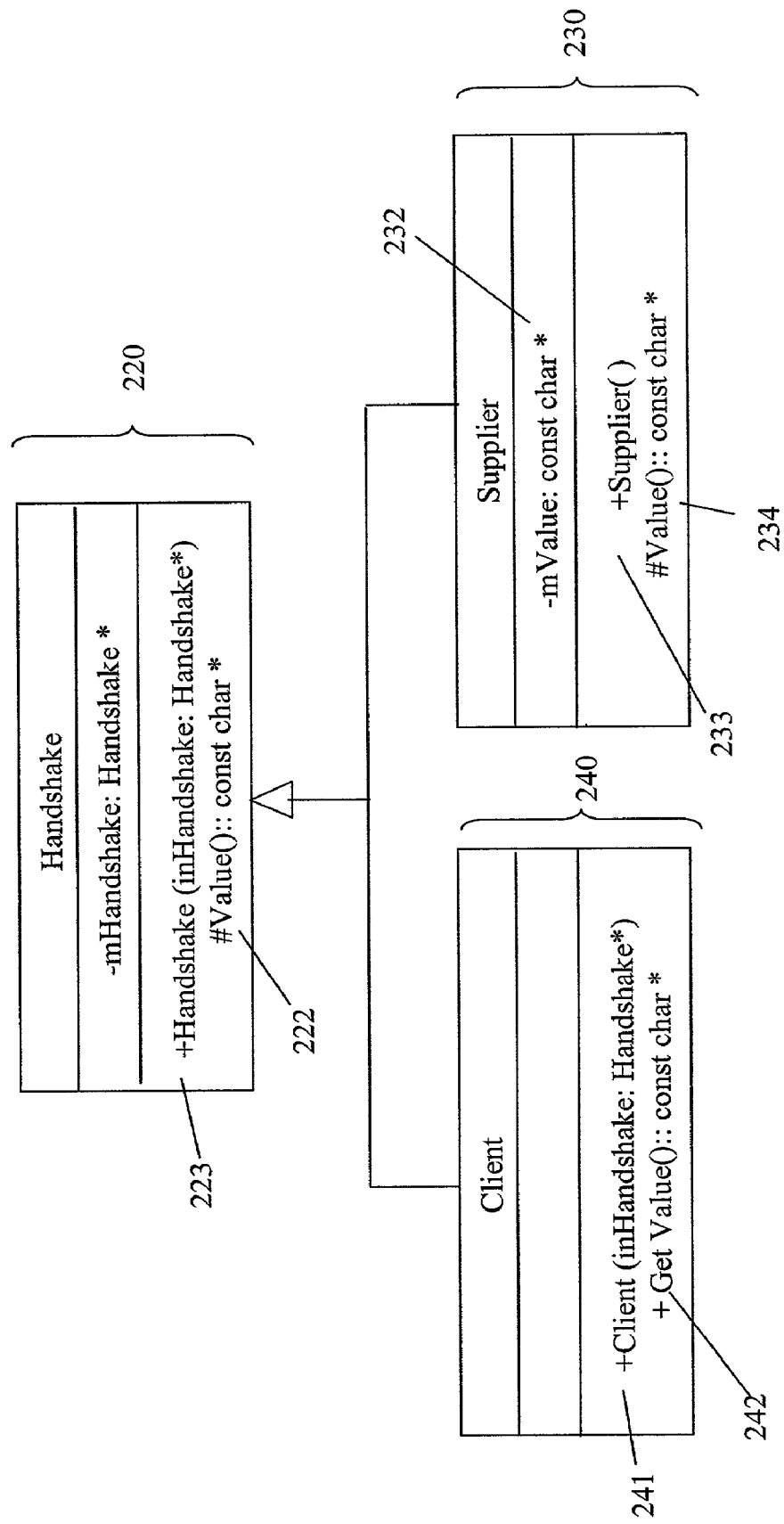
FIG. 2 is a class diagram for one embodiment of the classes of this invention.

In the embodiments of FIGS. 1A, 1B, and 2, two classes are defined, namely a first class 140, 240 that is a client and a second class 130, 230 that is a supplier. In this example, a client instance 141 needs to access at least one protected resource 132 that belongs to a supplier instance 131. Protected resource 132 (or protected member) is, for example, an attribute or a method.

In this embodiment of the invention, inheritance in an object-oriented computing environment is employed to enable selective access by client instance 141 to a selected one or selected ones of the resources of supplier instance 131. Inheritance is the process in an object-oriented computing environment whereby a derived class inherits members of its base class(es) and can access the public and protected members so inherited.

In an embodiment of the invention, as illustrated in FIG. 2, each of the first and second classes, i.e., client class 240, which is an example of client class 140, and supplier class 230, which is an example of supplier class 130, respectively, is defined as a class that is derived from and thereby inherits from a third class, called herein handshake class 220, which is an example of handshake class 120. Third class 220 could be thought of as a friendship class that provides for communication between first and second classes 240 and 230.

Handshake class 220 includes a protected virtual access method 222 that provides a vehicle enabling access, in use, to a selected one or more protected resources 232 from among resources of an instance of supplier class 230. However, handshake class 220 does not need to know about the resource(s) to be accessed as this protected virtual access method 222 is overloaded by a resource method 234 of supplier class 230. In other words, resource method 234 has the effect of replacing protected virtual access method 222 as an effect of inheritance.

Handshake class 220 defines explicitly resource(s) 232 of supplier class 230 that can be accessed by instances of client class 240. At the same time, handshake class 220 decouples supplier class 230 implementation from the services provided by supplier class 230.

Client class 240 inherits protected virtual access method 222 from handshake class 220 and a pointer to an instance of supplier class 230 as an implementation of handshake class 220.

An instance, e.g., supplier object 131, of supplier class 230 inherits from handshake class 220. The instance of supplier class 230 implements protected virtual access method 222 for accessing selected protected resource 232 by overloading that protected virtual access method 222 with resource method 234.

To access protected resource 232 of an instance of supplier class 230, an instance of client class 240 (or another object) calls access-resource method 222. Access-resource method 222 uses the pointer to the instance of supplier class 230 and the protected virtual method 222 as overloaded by resource method 234 to access resource 232.

As mentioned above, supplier class 230 overloads protected virtual method 222 of handshake class 220 with a resource method 234 as a result of the inheritance of an instance of the supplier class 230 from handshake class 220. Moreover, as a result of inheritance of client class 240 from handshake class 220, and using the pointer to the supplier instance, access-resource method 222 that is called by an instance of client class 240 is able to use resource method 234 that overloads protected virtual access method 222 to return protected resource 232 to the instance of client class 240. This is possible as both client class 240 and supplier class 230 are subclasses of handshake class 220.

Figure 3:
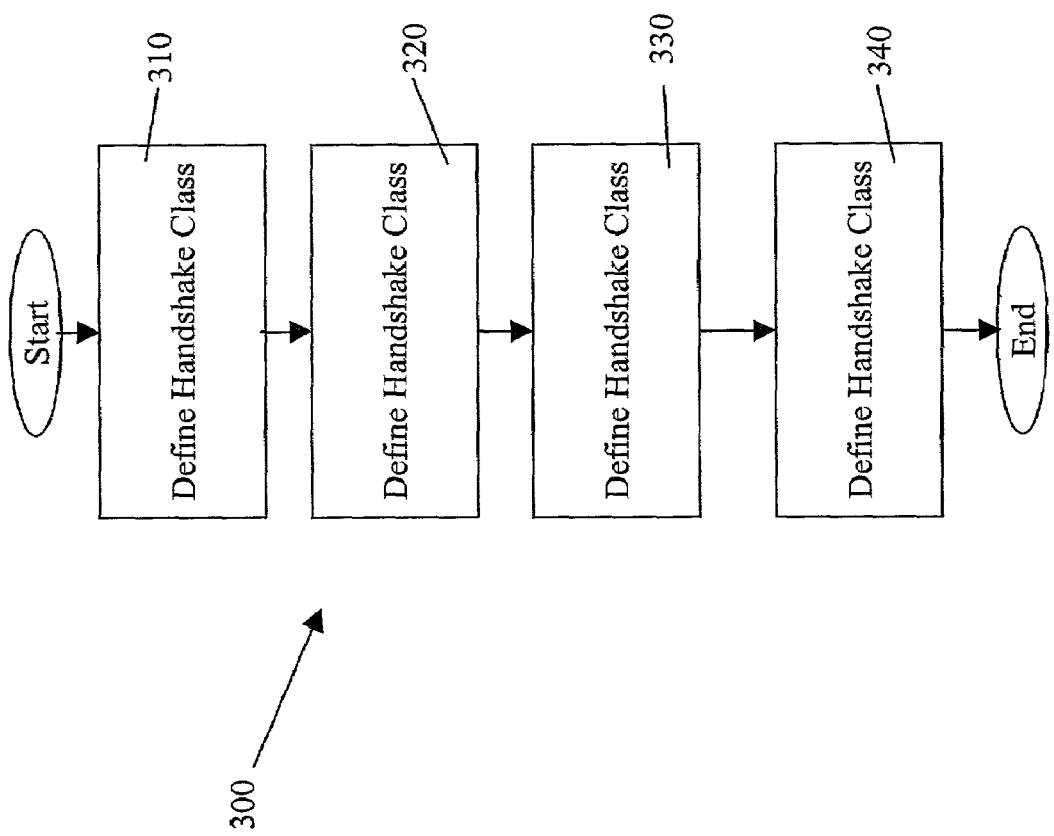
FIG. 3 is a process flow diagram illustrating a computer-based process where access in an object-oriented computing environment by an instance of a first class to a selected protected resource of an instance of a second class is achieved according to one embodiment of the present invention.

FIG. 3 is a process flow diagram illustrating a computer-based process 300 where access in an object-oriented computing environment by an instance of a first class to a selected protected resource of an instance of a second class is achieved.

In operation 310, a handshake class that includes a protected virtual method for accessing the selected protected resource is defined. Upon completion, operation 310 transfers processing to operation 320.

In operation 320, a client class is defined as a subclass of the handshake class. The client class inherits from the handshake class the protected virtual method for accessing the selected protected resource and a pointer to an instance of a supplier class as an implementation of the handshake class. Operation 320 transfers processing to operation 330

In operation 330, a supplier class is defined as a subclass of the handshake class. The supplier class inherits from the handshake class and implements the protected virtual method for accessing the selected protected resource by overloading that method. Operation 330 transfers processing to operation 340.

In operation 340, an instance of the client class calls the method inherited from the third class, which in turn uses the pointer to the instance of the second class and the overloaded method to access the resource.

The access-resource method of the client can be a public method. In this case, in operation 340, the accessing of the resource by the instance of the client is initiated in response to a call to the access-resource method of the instance of the client by another class of object, public classes being generally accessible to other objects.

A specific example of an implementation of one embodiment of the invention is described below with reference to Table 1.

TABLE 1

```
L01    // BEGINNING OF FILE
L02
L03    //==================================================//
L04    // handshake.cpp
L05    //==================================================
L06    //
L07
L08    #include <iostream.h>
L09
L10    class Handshake {
L11        protected:
L12            Handshake *        mHandshake;
L13        public:
L14            Handshake (Handshake * inHandshake) ;
L15        protected:
L16            virtual const char * Value (void) const;
L17    } ;
L18
L19    class Client : public Handshake {
L20        public :
L21            Client (Handshake * inHandshake) ;
L22            const char *   GetValue (void) const;
L23    } ;
L24
L25    class Supplier : public Handshake {
L26        protected:
L27            const char *   mValue;
L28        public:
L29            Supplier (void) ;
L30
L31        protected:
L32            virtual const char *   Value (void) const;
L33
L34    } ;
L35
L36    //-----------------------------------------------------------
L37
L38    Handshake: :Handshake (Handshake * inHandshake)
       {
L39        mHandshake        = inHandshake;
L40    }
L41    const char * Handshake : :Value (void) const {
L42        return mHandshake−>Value ( ) ;
L43    }
L44
L45    //-----------------------------------------------------------
L46
L47    Client: : Client(Handshake * inHandshake) : Handshake (inHandshake) {
L48    }
```

TABLE 1-continued

```
L49    const char * Client: :GetValue (void) const {
L50        return Value ( ) ;
L51    }
L52
L53    //----------------------------------------------------------------
L54
L55    Supplier : :Supplier (void) : Handshake (0) {
L56        mValue = "Value" ;
L57    }
L58    const char * Supplier : : Value (void) const {
L59        return mValue;
L60    }
L61    //----------------------------------------------------------------
L62    // main
L63    //----------------------------------------------------------------
L64
L65    int main (void) {
L66        Supplier            theSupplier;
L67        Client                     theClient (&theSupplier);
L68
L69        cout << theClient.GetValue( ) << endl;
L70
L71        return 0;
L72
L73    }
L74
L75    // END OF FILE
```

The example program source code presented in TABLE 1 is for use in a C++ computing environment. In the following description, a particular line or particular lines in TABLE 1 are referenced by citing the line number or line numbers in line numbers L01–L75. It should be noted that line numbers L01–L75 do not form part of the program code, but have been added simply for the purposes of identifying lines in the following description.

In this embodiment, handshake class, e.g., class 120 (FIG. 1) and class 220 (FIG. 2), is defined in lines L10 to L17. The execution of these lines is one embodiment of operation 310. A protected pointer to the handshake is defined in lines L11 and L12. A public constructor for initiating an instance of the handshake class is defined in lines L13 and L14. A protected virtual default method of the handshake class for retrieving the resource called Value is defined in lines L15 and L16.

For this embodiment, client class, e.g., class 140 (FIG. 1) and class 240 (FIG. 2), is defined in lines L19 to L23. The execution of these lines is one embodiment of operation 320. The client class is defined as a subclass that is derived from and thereby inherits from the handshake class in line L19. A constructor for initiating an instance of the client class is identified in lines L20 and L21. As the client class constructor identifies the same name as for the handshake class, the client class inherits the pointer from the handshake class, whereby the client class implements a handshake class pointer. A public resource access method of the client class for accessing the resource called Value is defined in line L22.

For this embodiment, supplier class, e.g., class 130 (FIG. 1) and class 230 (FIG. 2), is defined in lines L25 to L34. The execution of these lines is one embodiment of operation 330. The supplier class is defined as a subclass that is derived from and thereby inherits from the handshake class in line L25. A protected resource called Value is defined in lines L26 and L27. A void constructor for the supplier class is identified in lines L28 and L29. A resource method for retrieving the resource called Value is defined lines L31 and L32. This resource method overloads the protected virtual default method of the handshake class. The reasons for this are that the supplier class inherits from the handshake class and the resource method of the supplier class has the same name as the protected virtual default method of the handshake class.

An instance of the handshake class is illustrated in lines L38 to L43. Execution of these lines is an instantiation of the instance of the handshake class. The handshake class constructor is implemented in lines L38 to L40. A default implementation of the resource access method of the handshake class for this example is illustrated in lines L41 and L42. This implementation allows the client class instance to access the protected resource of the instance of the supplier class.

An instance of the client class is illustrated in lines L47 to L51. Execution of these lines is an instantiation of the instance of the client class. The client class constructor is implemented in lines L47 and L48. The client class is derived from the handshake class so the client class constructor calls the handshake class constructor. The client method that uses the default implementation of the handshake class is illustrated in lines L49 and L50. This method serves to show how the supplier-protected resource can be accessed from the client.

An instance of the supplier class is illustrated in lines L55 to L60. Execution of these lines is an instantiation of the instance of the supplier class. The supplier class constructor is implemented in lines L55 and L57. The supplier class is derived from the handshake class so the supplier class constructor calls the handshake class constructor. The supplier class implementation of the access-resource method inherited from the handshake is illustrated in lines L58 and L59. The supplier class implementation provides the access to the resource that forms a protected member of the supplier class.

Figure 4:
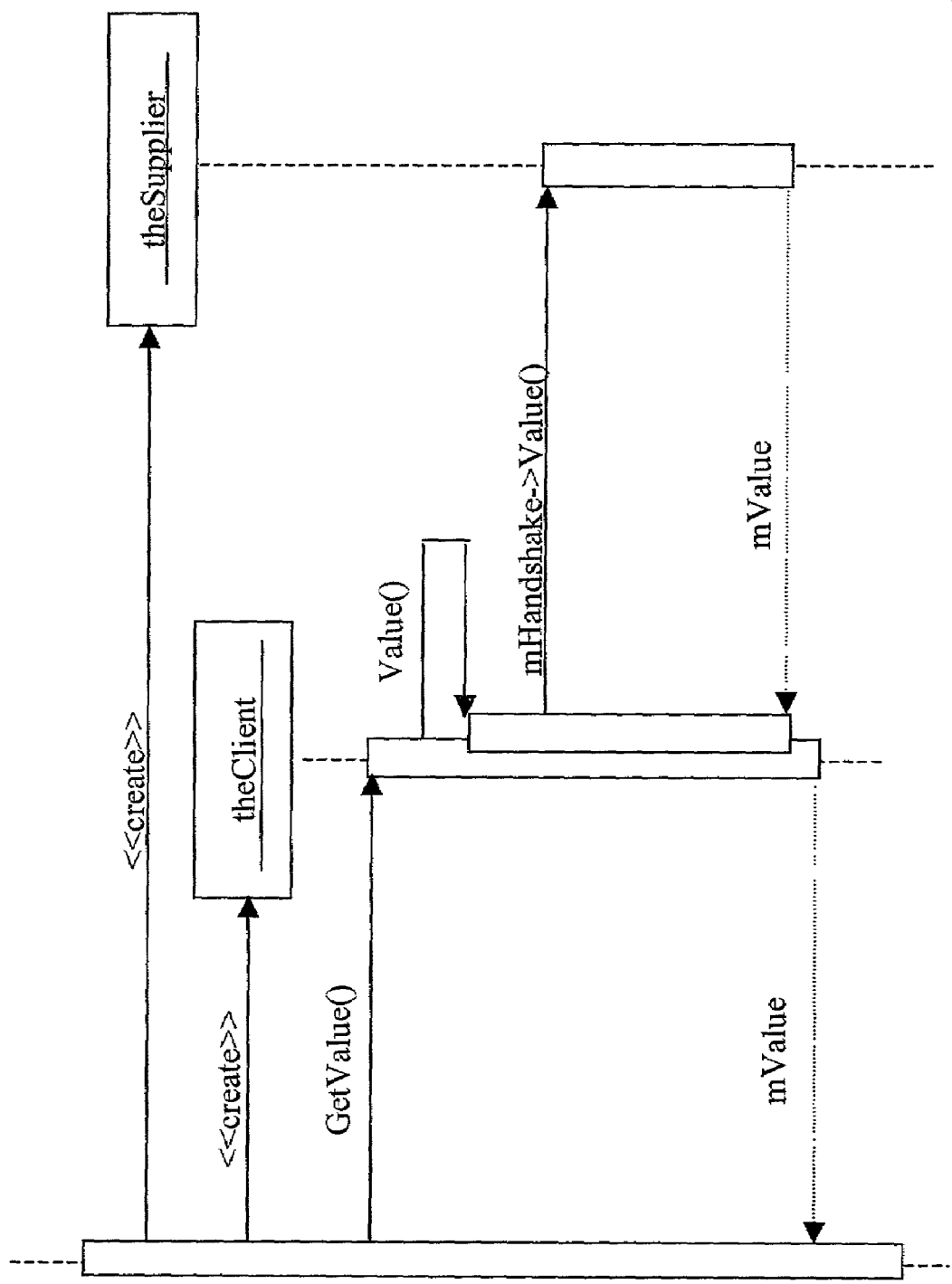
FIG. 4 is a sequence diagram for one embodiment of the present invention.

An example of the use of this embodiment of the classes is illustrated in lines L65 to L73. FIG. 4 is a sequence diagram that corresponds to lines L65 to L73. The creation of an instance of a supplier class is illustrated in line L66. This is illustrated in FIG. 4 by a first arrow with message <<create>> that results in an instance theSupplier of the supplier class.

The creation of an instance of a client class is illustrated in line L67. This is illustrated in FIG. 4 by a second arrow with message <<create>> that results in an instance theClient of the client class. The effect of the present example for retrieving a value that belongs to object theSupplier using the ability of object theClient to access protected members of object theSupplier is illustrated in line L69. Specifically, a message GetValue( ) that is sent to object theClient results in a message Value( ), that is directed to the protected virtual method inherited from the handshake class. Next, a message mHandshake→Value( ) is issued to instance theSupplier to access the method inherited from the handshake class that was overloaded. The overload method returns protected resource message mValue to object theClient that in turn returns protected resource message mvalue to the main program. Here cout is an object that represents the standard output stream.

A computer program product for implementing embodiments of the present invention is in the form of a computer program on a carrier medium. The carrier medium is a storage medium, such as solid-state magnetic optical, magneto-optical or other storage medium. In other embodiments, the carrier medium is a transmission medium such as broadcast, telephonic, computer network, wired, wireless, electrical, electromagnetic, optical or indeed any other transmission medium.

Accordingly, there has been described, a process whereby an instance of a first class can access a selected protected resource of an instance of a second class in an object-oriented computing environment. This involves defining a third class that includes a protected virtual method for accessing the selected protected resource. The first class is defined as a subclass of the third class such that the first class inherits from the third class an access-resource method for the protected resource and a pointer to an instance of the second class as an implementation of the third class. The second class is defined as a subclass of the third class such that the second class inherits from the third class and implements the protected virtual method for accessing the selected protected resource by overloading that method. With this structure in place, an instance of the first class calls the access-resource method inherited from the third class, which access-resource method uses the pointer to the instance of the second class and the overloaded method to access the resource.

While embodiments of the present invention have been described for a client-server configuration, and a stand-alone configuration. The embodiment of the present invention may be carried out using any suitable hardware configuration involving a personal computer, a workstation, a portable device, or a network of computer devices.

Herein, a computer memory refers to a volatile memory, a non-volatile memory, or a combination of the two in any one of these devices. Similarly, a computer input unit and a display unit refer to the features providing the required functionality to input the information described herein, and to display the information described herein, respectively, in any one of the aforementioned or equivalent devices.

While the invention has been particularly shown with reference to an embodiment thereof, it will be understood by those skilled in the art that various other changes in the form and details may be made therein without departing from the spirit and scope of the invention.

For example, in the above-described embodiment, the use of the handshake, or third class is used to enable a first class (client) to access protected resources of a second class (supplier). However, the approach described above could also enable the second class to access protected resources of the first class. This can be achieved by:

additionally providing the first class with additional features equivalent to those of the supplier described above;

additionally providing the second class with additional features equivalent to those of the client described above; and additionally providing the third class with additional features equivalent to those of the handshake described above, where the additional features having different names from those of the set of features described for the main embodiment, in order that they can be differentiated in operation.

I claim:

1. A computer-based process for enabling access in an object-oriented computing environment by an instance of a first class to a selected protected resource of an instance of a second class, the computer-based process comprising:

defining a third class that includes a protected virtual method for accessing the selected protected resource;

defining the first class as a subclass of the third class such that the first class inherits from the third class the protected virtual method for the selected protected resource and a pointer to an instance of the second class;

defining the second class as a subclass of the third class such that the second class inherits from the third class and implements the protected virtual method for accessing the selected protected resource by overloading that method to create an overloaded method; and calling an access-resource method by an instance of the first class, wherein the access-resource method uses the pointer to the instance of the second class and the overloaded method to access the resource.

2. The computer-based process of claim 1, wherein the access-resource method of the first class is a public method, and wherein the accessing of the resource by the instance of the first class is initiated in response to a call to the access-resource method of the instance of the first class.

3. The computer-based process of claim 1, wherein the object-oriented computing environment comprises a C++ computer program language computing environment.

4. The computer-based process of claim 1, wherein the resource comprises data.

5. The computer-based process of claim 1, wherein the resource comprises a function.

6. A computer program product comprising a storage medium having embedded thereon computer readable instructions for a process for enabling access in an object-oriented computing environment by an instance of a first class to a selected protected resource of an instance of a second class, the process comprising:

defining a third class that includes a protected virtual method for accessing the selected protected resource;

defining the first class as a subclass of the third class such that the first class inherits from the third class the protected virtual method for the selected protected resource and a pointer to an instance of the second class;

defining the second class as a subclass of the third class such that the second class inherits from the third class and implements the protected virtual method for accessing the selected protected resource by overloading that method to create an overloaded method; and calling an access-resource method by an instance of the first class, wherein the access-resource method uses the pointer to the instance of the second class and the overloaded method to access the resource.

7. The computer program product of claim 6 wherein the access-resource method of the first class is a public method, and wherein the accessing of the resource by the instance of the first class is initiated in response to a call to the access-resource method of the instance of the first class.

8. The computer program product of claim 6 wherein the object-oriented computing environment comprises a C++ computer program language computing environment.

9. The computer program product of claim 6 wherein the resource comprises data.

10. The computer program product of claim 6 wherein the resource comprises a function.

11. A computer system comprising:

a processor;

a memory coupled to said processor;

program code stored in said memory wherein execution of said program code by said processor result in a process for enabling access in an object-oriented computing environment by an instance of a first class to a selected protected resource of an instance of a second class, the process comprising:

defining a third class that includes a protected virtual method for accessing the selected protected resource;

defining the first class as a subclass of the third class such that the first class inherits from the third class the protected virtual method for the selected protected resource and a pointer to an instance of the second class;

defining the second class as a subclass of the third class such that the second class inherits from the third class and implements the protected virtual method for accessing the selected protected resource by overloading that method to create an overloaded method; and calling an access-resource method by an instance of the first class, wherein the access-resource method uses the pointer to the instance of the second class and the overloaded method to access the resource.

12. The computer system of claim 11 wherein the access-resource method of the first class is a public method, and wherein the accessing of the resource by the instance of the first class is initiated in response to a call to the access-resource method of the instance of the first class.

13. The computer system of claim 11 wherein the object-oriented computing environment comprises a C++ computer program language computing environment.

14. The computer system of claim 11 wherein the resource comprises data.

15. The computer system of claim 11 wherein the resource comprises a function.

16. A computer system for enabling access in an object-oriented computing environment by an instance of a first class to a selected protected resource of an instance of a second class, the computer system comprising:

means for defining a third class that includes a protected virtual method for accessing the selected protected resource;

means for defining the first class as a subclass of the third class such that the first class inherits from the third class the protected virtual method for the selected protected resource and a pointer to an instance of the second class;

means for defining the second class as a subclass of the third class such that the second class inherits from the third class and implements the protected virtual method for accessing the selected protected resource by overloading that method to create an overloaded method; and means for calling an access-resource method by an instance of the first class, wherein the access-resource method uses the pointer to the instance of the second class and the overloaded method to access the resource.

* * * * *